US012442422B2

(12) United States Patent
Yaguchi et al.

(10) Patent No.: US 12,442,422 B2
(45) Date of Patent: Oct. 14, 2025

(54) CLUTCH SYSTEM

(71) Applicant: GKN Automotive Limited, Birmingham (GB)

(72) Inventors: Yuu Yaguchi, Tochigi (JP); Takahiro Nagaoka, Tochigi (JP); Ryuya Saito, Tochigi (JP); Kazutaka Kawata, Tochigi (JP)

(73) Assignee: GKN Automotive Limited, Birmingham (GB)

( * ) Notice: Subject to any disclaimer, the term of this patent is extended or adjusted under 35 U.S.C. 154(b) by 151 days.

(21) Appl. No.: 18/463,681

(22) Filed: Sep. 8, 2023

(65) Prior Publication Data
US 2023/0417294 A1   Dec. 28, 2023

Related U.S. Application Data

(63) Continuation of application No. PCT/JP2021/010352, filed on Mar. 15, 2021.

(51) Int. Cl.
*F16D 25/0638* (2006.01)
*F16D 11/14* (2006.01)
(Continued)

(52) U.S. Cl.
CPC .............. *F16D 28/00* (2013.01); *F16D 11/14* (2013.01); *F16D 23/14* (2013.01); *F16D 48/06* (2013.01);
(Continued)

(58) Field of Classification Search
CPC .............. F16D 2023/123; F16D 11/14; F16D 2500/10462
See application file for complete search history.

(56) References Cited

U.S. PATENT DOCUMENTS

2003/0184171 A1   10/2003   Teraoka et al.
2004/0045750 A1   3/2004    Baraszu et al.
(Continued)

FOREIGN PATENT DOCUMENTS

JP   2003172429 A   6/2003
JP   2004100958 A   4/2004
(Continued)

OTHER PUBLICATIONS

International Search Report and Written Opinion for PCT/JP2021/010352 mailed May 25, 2021 (9 pages; with English translation).

*Primary Examiner* — Stacey A Fluhart
(74) *Attorney, Agent, or Firm* — Reising Ethington P.C.

(57) ABSTRACT

A system for controlling a clutch is provided with: an action member rotatable about an axis; a motor drivingly connected to the action member to impart a rotational motion about the axis to the action member; a conversion mechanism drivingly connected to the action member to convert the rotational motion about the axis into an axial motion; a clutch member constituting the clutch and drivingly connected to the conversion mechanism so as to be driven by the axial motion, the clutch member being movable axially bidirectionally from a first position where the clutch is disconnected, through a second position, to a third position where the clutch is connected; and a controller configured to measure and compare a rotational angle of the motor with a reference value to determine at which of the first position, the second position, and the third position the clutch member is.

5 Claims, 11 Drawing Sheets (51) Int. Cl.
*F16D 23/14* (2006.01)
*F16D 28/00* (2006.01)
*F16D 48/06* (2006.01)
F16D 23/12 (2006.01)

(52) U.S. Cl.
CPC .............. *F16D 2023/123* (2013.01); *F16D 2500/1023* (2013.01); *F16D 2500/10462* (2013.01)

(56) References Cited

U.S. PATENT DOCUMENTS

| | | | | |
|---|---|---|---|---|
| 2016/0101690 | A1* | 4/2016 | Imafuku | F16H 48/24 74/665 G |
| 2017/0241486 | A1* | 8/2017 | Pritchard | F16D 23/14 |
| 2017/0248172 | A1* | 8/2017 | Weidemann | F16D 11/14 |
| 2019/0017557 | A1* | 1/2019 | Arai | B60K 17/35 |
| 2020/0063806 | A1* | 2/2020 | Ekonen | F16D 27/108 |
| 2022/0145943 | A1* | 5/2022 | Uchida | F16D 23/12 |

FOREIGN PATENT DOCUMENTS

| | | |
|---|---|---|
| JP | 2004208460 A | 7/2004 |
| JP | 2020024012 A | 2/2020 |
| WO | 2018109874 A1 | 6/2018 |
| WO | 2018118912 A1 | 6/2018 |

\* cited by examiner

CLUTCH SYSTEM

CROSS-REFERENCE TO RELATED APPLICATIONS

This application is a continuation Application of PCT International Application No. PCT/JP2021/010352 (filed Mar. 15, 2021), the entire contents of which are incorporated herein by reference.

BACKGROUND

Rotary or rotating machines applied to vehicles often use clutches in order to control, e.g., selectively set on and off or engage or disengage their operations. A so-called lock-up differential for example has a built-in dog clutch that is typically disconnected to enable differential motion between output axles and that, when connected by an external actuator, locks up the differential motion.

Even when the actuator is brought into operation, the clutch may fail to get connected or become engaged in rare cases such where clutch teeth happen to be at inappropriate positions for mutual engagement. Further, even when the actuator is operated in a reverse direction, temporary adhesion between the clutch teeth caused by viscosity of lubricant oil or magnetization might delay disengagement or disconnection of the clutch. That is, switching the actuator on and off does not necessarily correspond to connection and disconnection (or engaging and disengaging) of the clutch. To prevent unintended or unexpected movements, devices for detecting whether the clutch is connected or not may be utilized.

SUMMARY

The present disclosure relates to a system for controlling a clutch, and in particular to a clutch system that includes determining the positions of a clutch member using the fact that rotational angles of a motor reflect positions of the clutch member.

Meshing clutches such as a dog clutch, unlike friction clutches, have no play or slippage between clutch members, and thus reliably transmit torque when connected and are free from energy loss when disconnected. These clutches, however, may often generate noise, vibrations, and/or harshness ("NVH") arising from collision between the dog teeth in a transitional state between disconnection and connection. In order to improve vehicle comfort, managing NVH in vehicles has been an ongoing issue.

The device disclosed below addresses problems that can arise in a clutch system in the transitional state.

According to an aspect, a system for controlling a clutch for regulating transmission of torque about an axis to a vehicle, is provided with: an action member rotatable about an axis; a motor drivingly connected to the action member to impart a rotational motion about the axis to the action member; a conversion mechanism drivingly connected to the action member to convert the rotational motion about the axis into an axial motion; a clutch member constituting the clutch and drivingly connected to the conversion mechanism so as to be driven by the axial motion, the clutch member being movable axially bidirectionally from a first position where the clutch is disconnected through a second position to a third position where the clutch is connected; and a controller configured to measure and compare a rotational angle of the motor with a reference value to determine at which of the first position, the second position, and the third position, the clutch member is.

DESCRIPTION OF EMBODIMENTS

Exemplary embodiments will be described hereinafter with reference to the drawings. Throughout the following description and claims, unless otherwise described, an axis means a central axis of a clutch, which is typically also a rotation axis of a power transmission device. Drawings are not necessarily to scale and therefore it is noted that dimensional relations are not limited to those drawn therein.

A clutch system disclosed hereafter can be combined with a rotary machine in a vehicle to comprise a power transmission device, and can be used for connecting/disconnecting a clutch from the exterior of the rotary machine to control its operation. Torque for driving the vehicle is, when the clutch is connected, transmitted through the clutch and is, when the clutch is disconnected, cut off.

Figure 1:
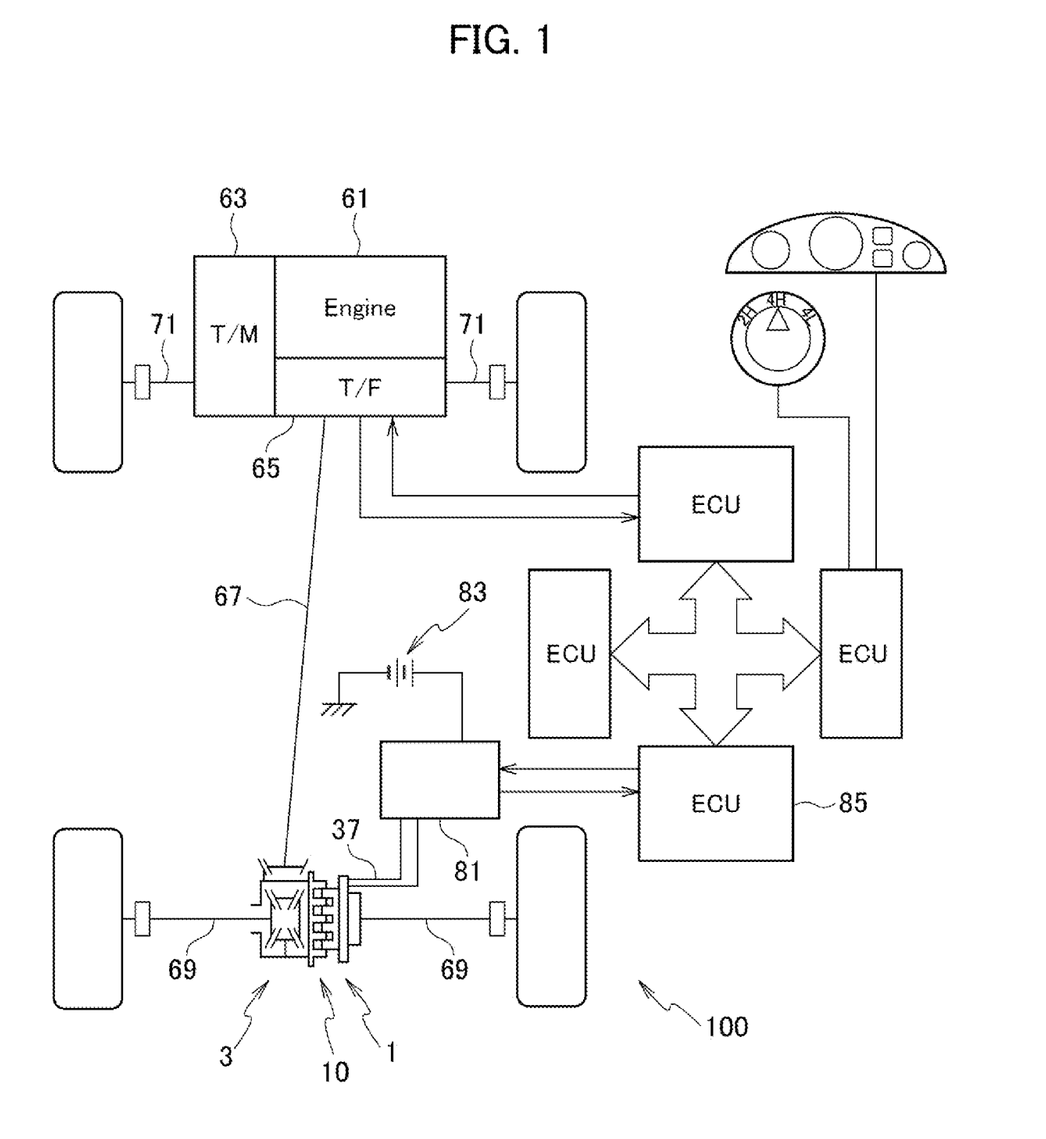
FIG. 1 is a block diagram of a vehicle with a system for controlling a clutch.

Referring to FIG. 1, the vehicle 100 is provided with an engine or motor 61. Torque generated by the engine or motor 61 is transmitted through a transmission 63, a transfer 65, and a propeller shaft 67 to a differential 3, and thereby distributed to rear wheels 69 (in a case of a rear differential, or FR, vehicle). Alternatively, the transfer 65 may also distribute the torque in part to front wheels 71 (in a 4WD vehicle), or the torque may be distributed from the transmission 63 through a front differential only to the front wheels 69 (in a front differential, or FF, vehicle). The differential 3 has a built-in dog clutch 10, which is driven by a suitable actuator 1 installed outside a case 15, in order to control its operations.

Figure 2:
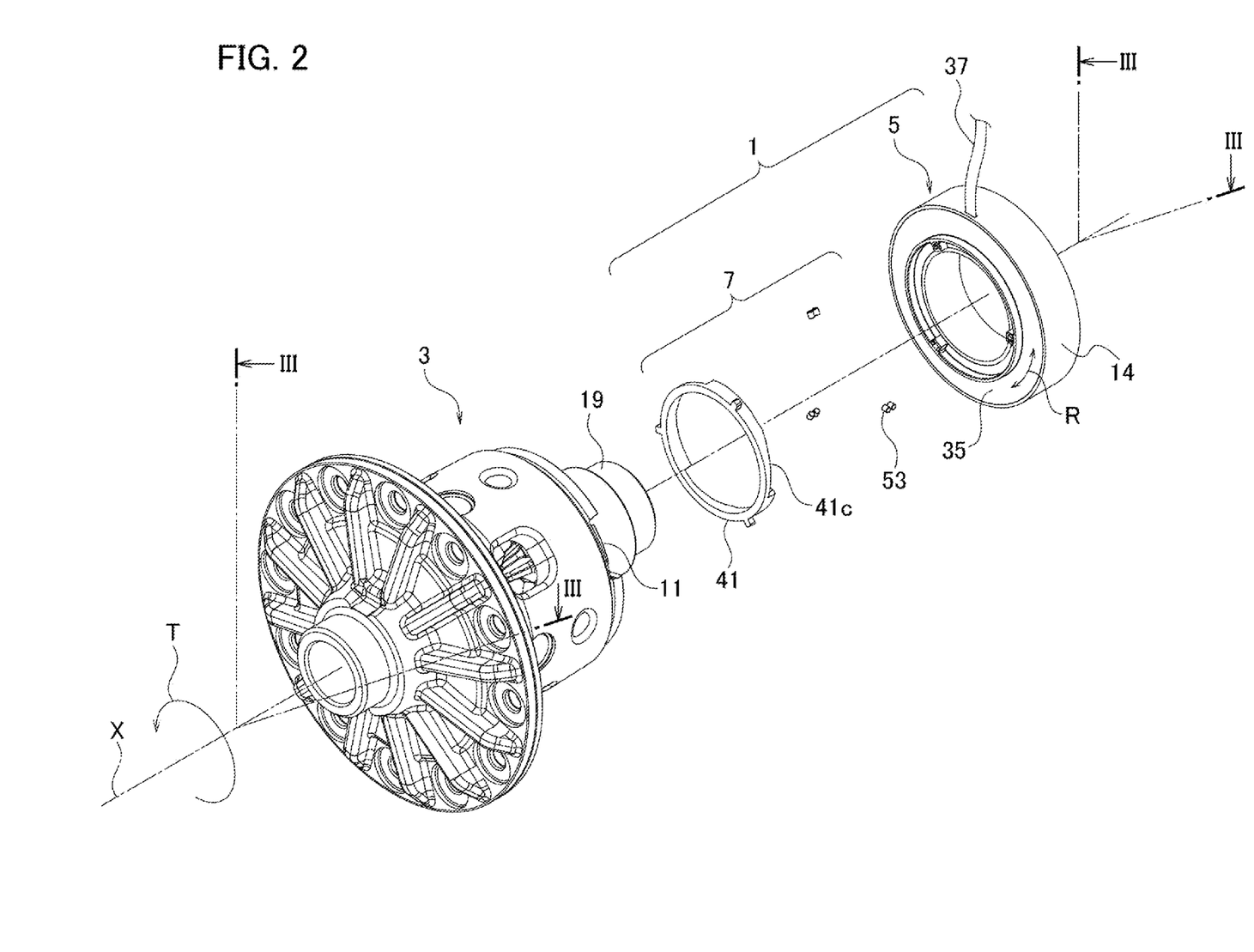
FIG. 2 is a partially exploded perspective view of a differential with a clutch system.
Figure 3:
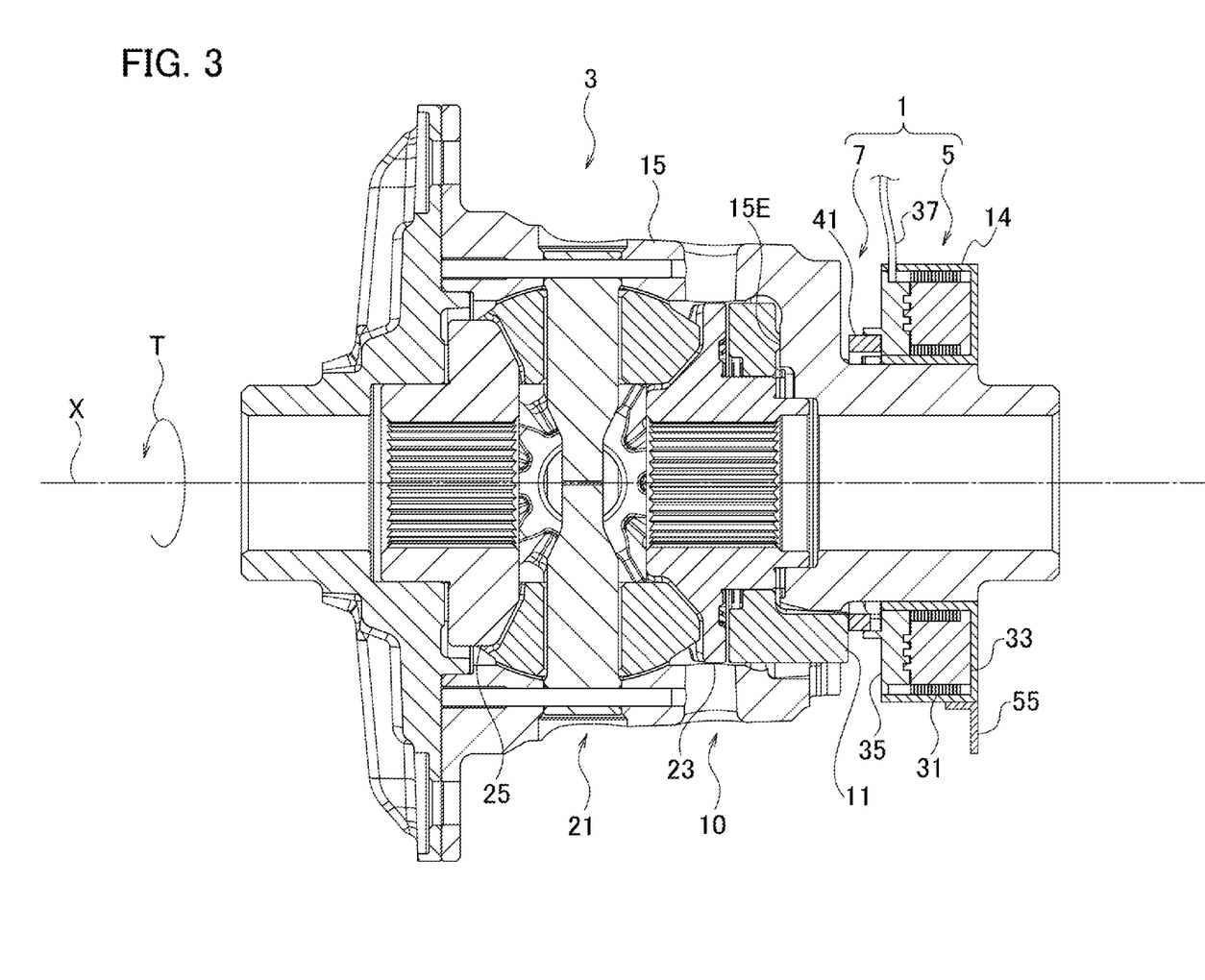
FIG. 3 is a sectional elevational view of the differential with the clutch system, taken from a line III-III in FIG. 2.
Figure 4:
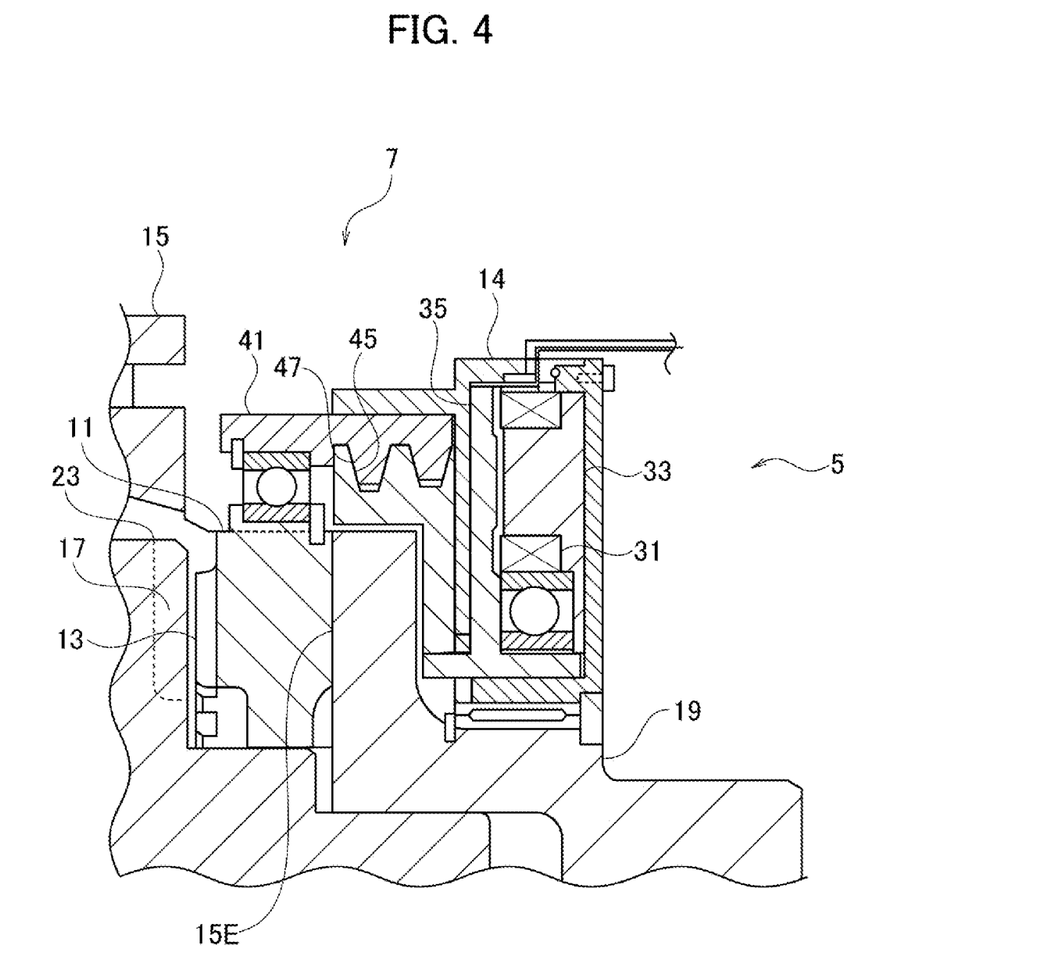
FIG. 4 is a sectional elevational view of the clutch system with a conversion mechanism using a screw thread or a spiral track.

A clutch system may be used for controlling the dog clutch 10. FIGS. 2 through 4 depict an example of the system in combination with a so-called lock-up differential, although it may be combined with a so-called free-running differential. Applications of the system are, of course, not limited to these examples. On the basis of this disclosure, the clutch system may be used in a wide range of rotary machines with dog clutches, and exemplary embodiments may include a transmission, a power transfer unit (PTU), or a coupling device. The clutch is for example a so-called dog clutch provided with dog teeth, whereas various types of clutches may be generally applicable as long as these clutches have structures that use engagement by mutual meshing, and not friction, to transmit the torque.

Referring mainly to FIG. 1 along with FIG. 2, a solenoid 31 is electrically connected through a cable 37 to an external electric circuit 81. The electric circuit 81 may be, alternatively, accommodated partly or totally in the actuator 1, or built in any of ECUs, as will be described. The vehicle is typically provided with a plurality of electronic control units (ECUs), each of which is programmable to electronically control various parts thereof. Each ECU is provided with a storage device for storing commands and data and a microcontroller capable of reading them out of the storage and executing the commands. The plurality of ECUs utilize a so-called controller area network (CAN) for example to perform mutual communication and share information.

One ECU 85 of them is connected to the electric circuit 81 to control the operations thereof. Or, the electric circuit 81 is embedded in the ECU 85 and runs under its control. The electric circuit 81 is further connected to an electric power source 83 and, under the control by the ECU 85, applies or cut off electric power to the solenoid 31. The power applied to the solenoid 31 may be of a direct current, an alternate current, a pulsatile current or pulses.

Referring mainly to FIG. 3 in combination with FIG. 2, the differential 3 is a rotary body capable of generating rotation T about the axis X and having the clutch 10 built therein. The differential 3 is a provided with a differential gear set 21 coupled to its case 15 and the differential gear set 21 is provided with side gears 23, 25, which are respectively coupled with axles. More specifically, the differential gear set 21 function as a medium for distributing torque received by the case 15 to the side gears 23, 25 with allowing differential motion therebetween. FIG. 3 depicts an example of a bevel gear type but any other type such as a face gear type or a planetary gear type may be used.

In the illustrated example, a clutch member 11 capable of transmitting the torque from the case 15 is movable axially and the side gear 23 is provided with clutch teeth and thereby capable of meshing with the clutch member 11, thereby the combination of the clutch member 11 and the clutch teeth comprises the clutch 10. When the actuator 1 drives the clutch member 11 so that the clutch 10 is connected, the side gear 23 is temporarily united with the case 15, thereby transmitting the torque. Then, as the other side gear 25 cannot generate differential motion relative to the side gear 23, the differential 3 falls into a so-called "differential lock" state where it loses its differential function. When the actuator 1 makes the clutch 10 disconnected, the differential 3 differentially distributes the torque received by the case 15 to both the axles.

The actuator 1 is generally provided with a motor 5 that can generate a rotational motion R about the axis X, and a conversion mechanism 7 for converting the rotational motion R into a linear motion in a direction along the axis X. The entire body of the actuator 1 is set coaxial with a rotary machine such as the differential 3, in particular its boss portion 19, and is disposed adjacent to, or in contact with, one end face of the rotary machine.

The motor 5, as shown in FIG. 2, and possibly also the conversion mechanism 7, as shown in FIG. 3, may be housed in the housing 14, and the housing 14 is retained by a carrier on the vehicle body, thereby being prevented from rotating. The anti-rotation (i.e., prevention from rotating) may be implemented by any relatively simple structure, such as a structure shown in FIG. 3, for example, where a tab 55 fixed to the outer periphery of the housing 14 is engages with the carrier. Of course, the housing 14 may be provided with any suitable structure, instead of the tab, for directly engaging with the carrier, and a counterpart may be any element other than the carrier.

Referring to FIG. 3 or FIG. 4 in combination with FIG. 2, the motor 5 is generally provided with the solenoid 31 for generating magnetic flux in response to application of the electric power, a stator 33 for conducting the magnetic flux, and a rotor 35 for, generating the rotational motion R about the axis X by the received magnetic flux. The stator 33 along with the solenoid 31 is prevented from rotating about the axis X relative to the housing 14, and can be rendered immovable in the axial direction.

The rotor 35 is formed of a magnetic material so as to receive the magnetic flux and be driven thereby. To receive the magnetic flux led through the stator 33, the rotor 35 is slightly apart in the direction of the axis X from, and opposed to, the stator 33. As will be readily understood from these drawings, the rotor 35 may be a hollow shaft and may be disposed coaxially with the case 15, and rotatable about its boss portion 19. More specifically, in this example, the rotor 35 can generate the rotational motion R about the axis X.

Alternatively, the rotor 35 may be eccentric from the case 15. In this case, the rotor 35 may be not hollow but any solid gear shaft may be led out thereof and be in gear mesh with and drive the conversion mechanism 7.

Any of the examples shown in FIGS. 3, 4 illustrate an axial gap motor in which the rotor and the stator are aligned in the axial direction and the magnetic flux is led out in the direction parallel to the axis. In place of the axial gap motor, of course, a so-called radial gap motor in which a rotor is disposed coaxial with, and proximately radially outward or inward to, a stator, is also applicable. Still further alternatively, any other suitable type of a motor is applicable.

As described already, the solenoid 31 is electrically connected through the cable 37 to the external electric circuit 81, and the electric circuit 81 generates alternate or pulsed currents having phase differences and inputs them to the respective coils of the solenoid, thereby causing the rotor 35 to generate the rotational motion R. Directions of the rotational motion R can be controlled by the directions of the phase differences, and specifically the motor 5 can generate the rotational motion R in both positive and negative directions. To generate the alternate or pulsed currents, any suitable switching device(s) can be used, e.g., any semiconductor devices such as insulated gate bipolar transistors (IGBTs). Further, while the above descriptions concern a so-called inductive motor, alternative possibilities include a synchronous motor, a permanent magnet motor, a commutator motor, a direct-current motor and any various type of motors.

The conversion mechanism 7 is drivingly coupled with the rotor 35 and converts its rotational motion R into the linear motion, thereby outputting the linear motion to a thrust member 41. A cam mechanism, a ball cam mechanism, a screw mechanism, or a roller screw mechanism, could be used for such conversion, for example. While FIG. 2 shows an example of the cam mechanism, the thrust member 41 is formed in a ring-like shape and has cam slopes 41c on a face opposed to the rotor 35, each of which tilts in the circumferential direction. The rotor 35 is correspondingly provided with suitable structures slidable on the cam slopes 41c. When the rotor 35 is in the rotational motion R, the thrust member 41 prevented from rotation is thrust along the cam slopes 41c in the axial direction.

While in the above example the rotor 35 serves as an action member to directly drive the thrust member 41, alternatively as shown in FIG. 4, an independent action member 45 may be drivingly coupled with the rotor 35 and the action member 45 may be set into the rotational motion R to drive the thrust member 41. The cam slopes 41c may be not on the thrust member 41, but instead the rotor 35, or the action member 45 may have the cam slopes. Or, another intervening member may be provided with the cam slopes.

The coupling between the rotor 35 and the action member 45 may be made by tight-fitting as shown in FIG. 4, whereas spline- or key-coupling may be used and further gear-meshing may be used to transmit rotation. As described already, in a case where the rotor 35 and the conversion mechanism 7 do not share a common axis, a gear-meshing may be readily used.

To smooth the sliding motion of the rotor 35 or the action member 45 on the cam slopes 41c, rollers 53 may be interposed therebetween. In the example shown in FIG. 2, the rotor 35 is provided with pockets 35c for holding the roller 53, and thus the rollers 53 follow the rotation of the rotor 35 to roll over the cam slopes 41c, thereby driving the thrust member 41 in the axial direction. Each roller 53 may be formed in a cylindrical or truncated conical shape. Or, a ball shape may be applied and then the conversion mechanism 7 may comprise a ball cam mechanism.

Legs of the clutch member 11 pass through an end wall 15E, for example, of the case 15 and are thus led out to the exterior, and the thrust member 41 is in contact with them to drive the member. Or, as shown in FIG. 4 for example, the thrust member 41 and the clutch member 11 may be made to unitarily move on the basis of any suitable engaging structure. Yet further alternatively, any coupling by bolts or the like may be used instead of engagement. The legs of the clutch member 11 may not be led out of the case 15 to the exterior and instead they may be coupled with the thrust member 41 through any openings opened on side walls of the case 15. Further, as described already, the act of driving the thrust member 41 may be made by any spiral track or screw structure 47 exemplarily shown in FIG. 4, in place of the cam slopes.

Figure 5A:
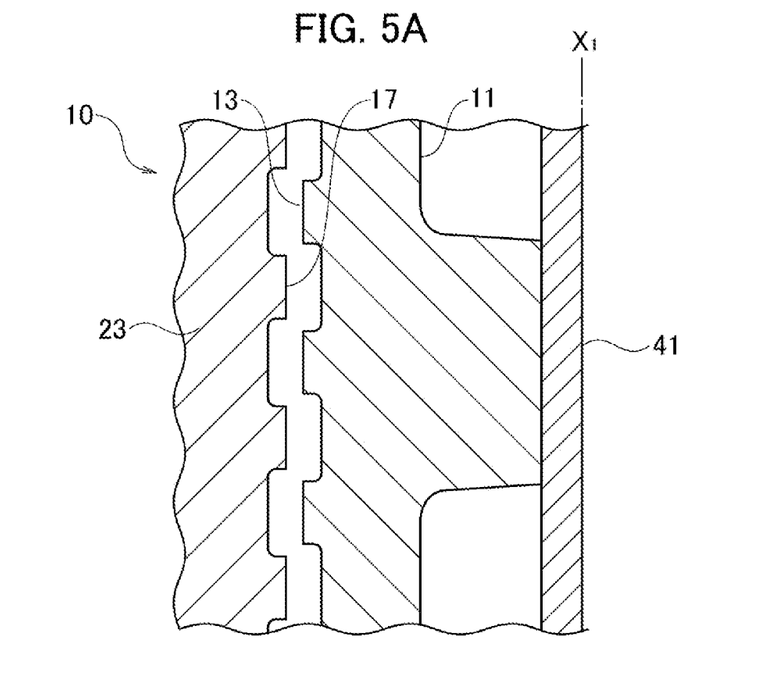
FIG. 5A is a schematic sectional view of the clutch, which shows a disconnected state.
Figure 5B:
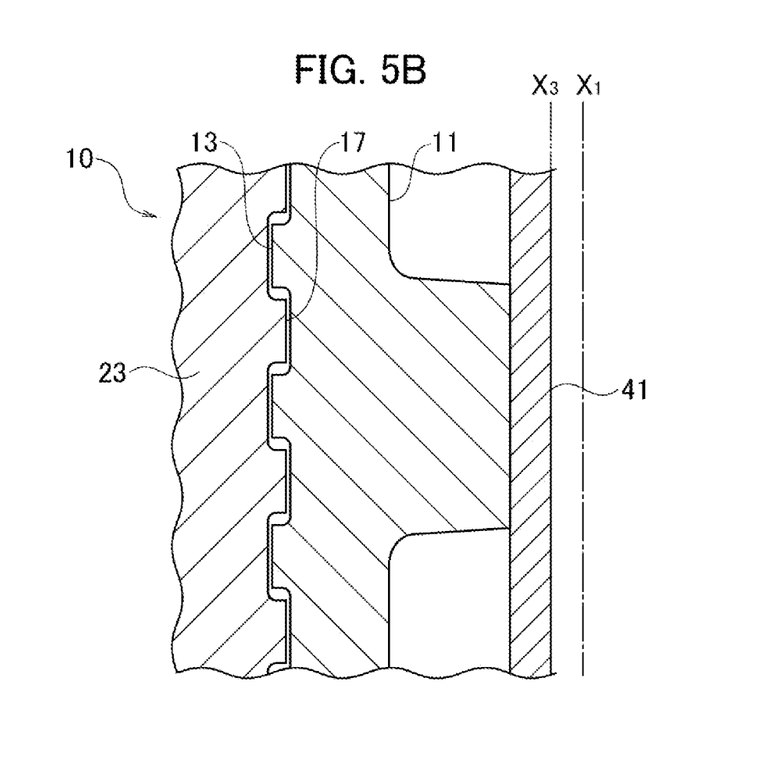
FIG. 5B is a schematic sectional view of the clutch, which shows a connected state.

As will be understood from the above description, when the rotor 35 generates the rotational motion R, the conversion mechanism 7, via the thrust member 41, drives the clutch member 11 in the axial direction. As shown by an example in FIG. 5A, when the thrust member 41 is at an initial position $x_1$, the clutch teeth 13 of the clutch member 11 are apart from the clutch teeth 17 of the side gear 23, i.e., the clutch 10 is disconnected. As shown by an example in FIG. 5B, when the thrust member 41 moves to a terminal position x3 and then the clutch member 11 correspondingly moves, the clutch teeth 13 and the clutch teeth 17 are mutually in mesh, i.e., the clutch 10 is connected. In contrast, as it rotates in a reverse direction, the conversion mechanism 7 moves the clutch member 11 from the position where the clutch 10 is connected to the position where it is disconnected. To promote disconnection of the clutch 10, a repulsive body such as a spring is applicable. To the contrary, the repulsive body may be used in a direction to promote connection. The repulsive body is, of course, neither essential nor inherent in these embodiments. In any case, rotational angles of the rotor 35 about the axis X reflect positions of the thrust member 41. In the meantime, the distinction between the initial position $x_1$ and the terminal position $x_3$ is only for descriptive purposes and does not mean that any of them is a position in a steady state.

Figure 5C:
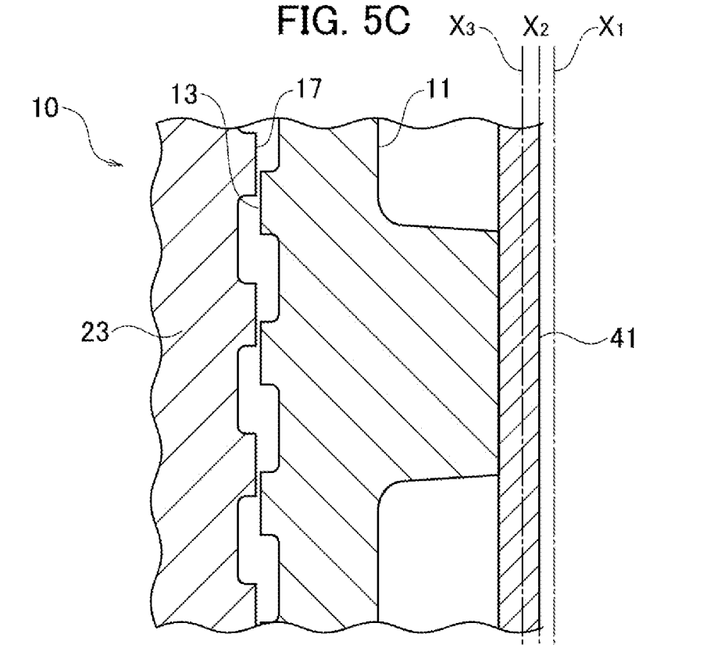
FIG. 5C is a schematic sectional view of the clutch, which shows a transitional state where clutch teeth cannot mesh together.
Figure 5D:
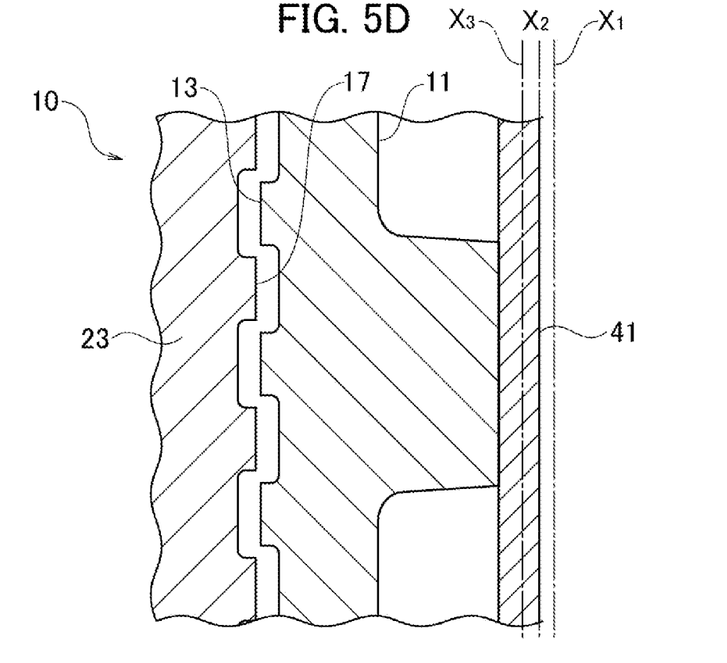
FIG. 5D is a schematic sectional view of the clutch, which shows a transitional state where each tooth top stands directly in front of each tooth bottom so that the clutch teeth can mesh together.

Referring to FIGS. 5C and 5D, a case where the thrust member 41 is at a transitional position $x_2$ between the initial position $x_1$ and the terminal position $x_3$ may be problematic. As shown in FIG. 5C, for example, connection of the clutch 10 would be interrupted when the clutch teeth 13 are located to cause collision with the clutch teeth 17, and as well NVH would occur if the clutch member 11 still in this state rotates relative to the side gear 23. The NVH could be suppressed by waiting until the clutch teeth 13 come where they could be in mesh with the clutch teeth 17, as exemplarily shown in FIG. 5D. That is, if the clutch system could determine at which of the initial position $x_1$, the transitional position $x_2$, and the terminal position $x_3$, the clutch member 11 is, the system would provide various benefits.

Figure 6:
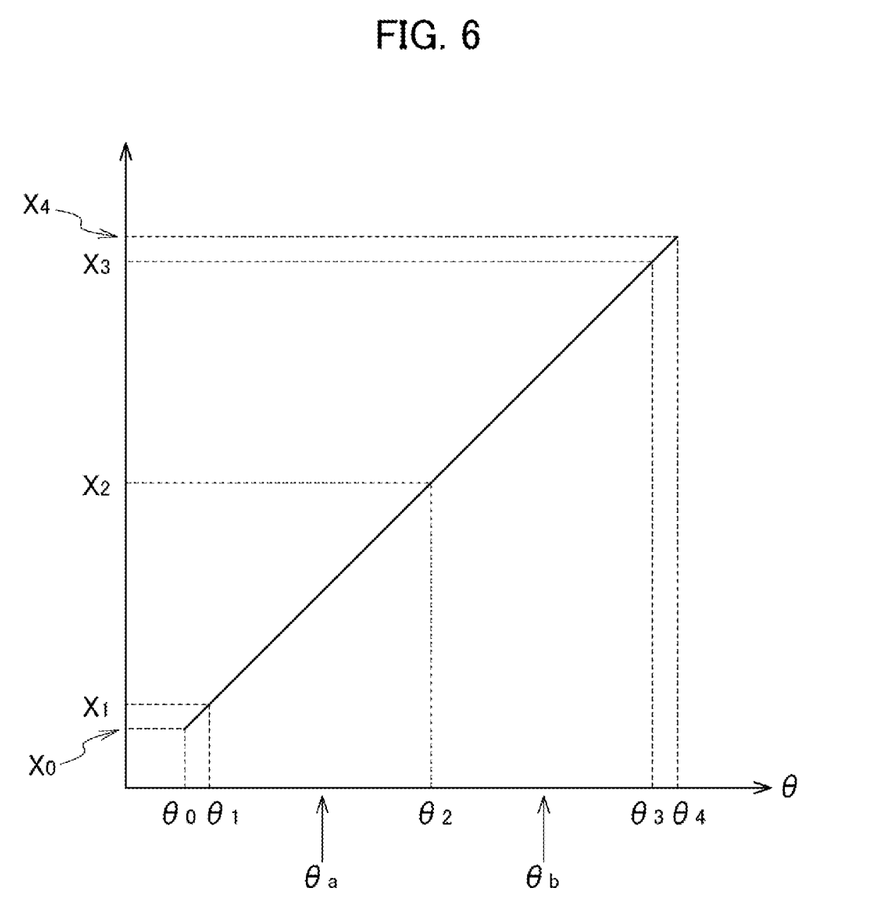
FIG. 6 is a graph schematically showing a relation between rotational angles of a rotor and positions of a thrust member.

Referring to FIG. 6, by utilizing the fact that the rotational angle θ of the rotor 35 reflects the position of the thrust member 41, and accordingly the position of the clutch member 11, the system can detect the position of the clutch member 11, not by detecting its position directly, but by measuring the rotational angle θ. When the rotational angles $\theta_1$, $\theta_2$ and $\theta_3$ respectively correspond to the positions $x_1$, $x_2$ and $x_3$, for example, the clutch system can determine the state of the clutch 10 by comparing the rotational angle θ with any suitable reference values $\theta_a$ and $\theta_b$. The reference values $\theta_a$ and $\theta_b$ may be specified in advance in light of any structural play or the like in the conversion mechanism 7 and the other elements, and these values may be stored in the storage of the ECU 85.

For the measurement of the rotational angle θ of the rotor 35, inductance or the like of the electric circuit 81 may be used. The solenoid 31 for example has a characteristic inductance and, if any alternate voltage is imposed on the driving current applied thereto, its inductance change caused by rotation of the rotor 35 can be read out and accordingly the rotational angle θ can be read out. In this example, the electric circuit 81 is provided with an oscillator to generate an alternate voltage with a characteristic frequency, which it superimposes on the current for driving the actuator 1. The superimposed electric power may be sufficiently small as compared with the power for driving so as not to affect the behavior of the rotor 35. The frequency may be selected so as not to affect the behavior of the rotor 35, and in light of convenience of separating of the superimposed component from the driving electric power.

Figure 7:
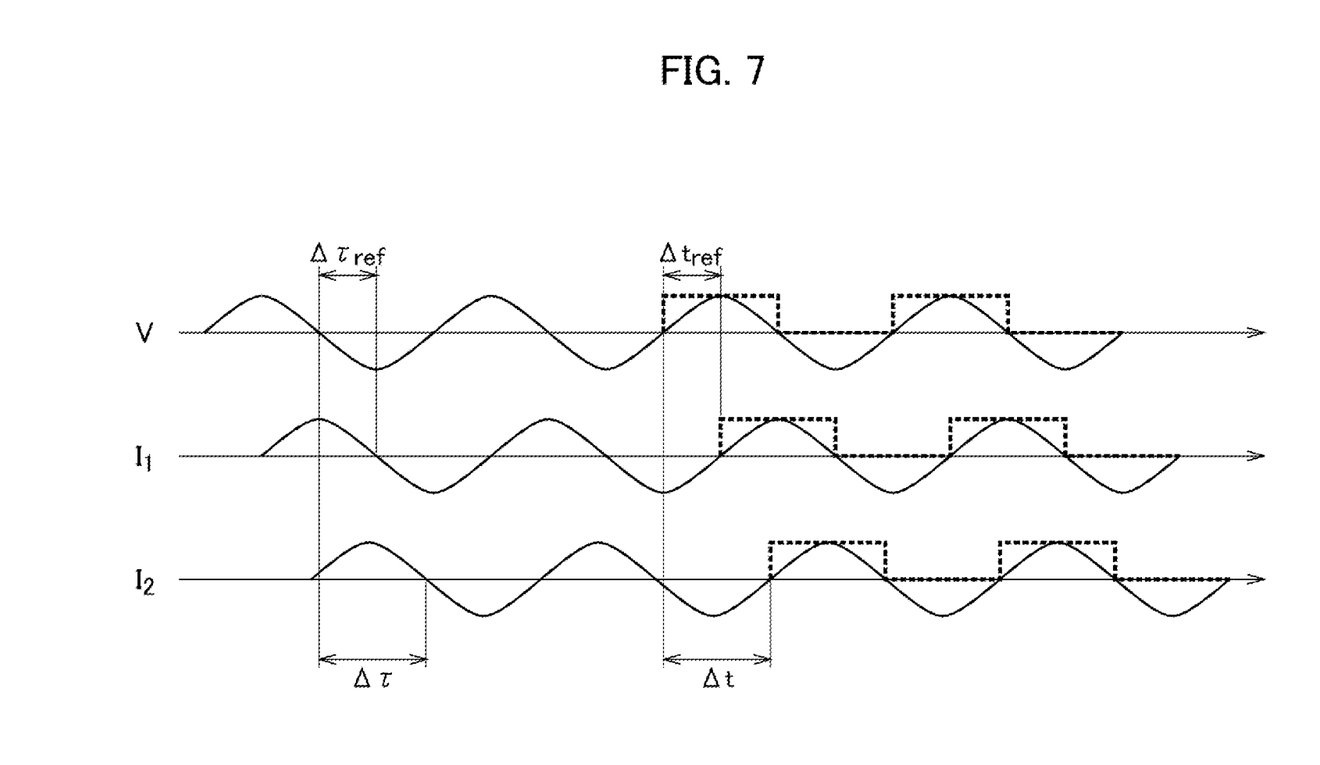
FIG. 7 is a schematic waveform chart as to a phase difference of a current relative to a voltage, which shows an influence of positions of the rotor relative to a stator on the phase difference.

Referring to FIG. 7, in the superimposed alternate electric power, the current $I_1$ has a phase difference $\Delta\phi_{ref}$ relative to the voltage V. When the rotor 35 moves from a first position to a second position relative to the stator 33, the inductance in the solenoid 31 changes in response to the change in position, and, as a result, the phase difference $\Delta\phi$ relative to the voltage V changes. On the other hand, because use of any suitable band-pass filter could enable separation of the superimposed alternate electric power from the power for driving without difficulty, it is also easy to detect the phase difference Δϕ further therefrom. The ECU 85 could read out the phase difference Δϕ through the electric circuit 81 to calculate the rotational angle θ.

In place of the rotor 35, of course, inductance changes may be read from travel of any other member. The clutch system may be, alternatively, provided with any additional electromagnetic coil independent of the solenoid 31, with respect to which an inductance change may be read. Further, instead of the inductance change, a capacitance change could be used.

The clutch system may be provided with means for reading the rotational angle θ of the rotor 35. One example of such means is an encoder attached to the rotor 35, the action member 45, or any element rotating along with these elements, and a proximity sensor equipped in connection with the encoder. For example, each time cuts formed on the encoder pass in front of the proximity sensor, the sensor outputs corresponding pulses. Then the ECU 85, or any other ECU can, by counting the pulses, read out the rotational angle θ.

Figure 8:
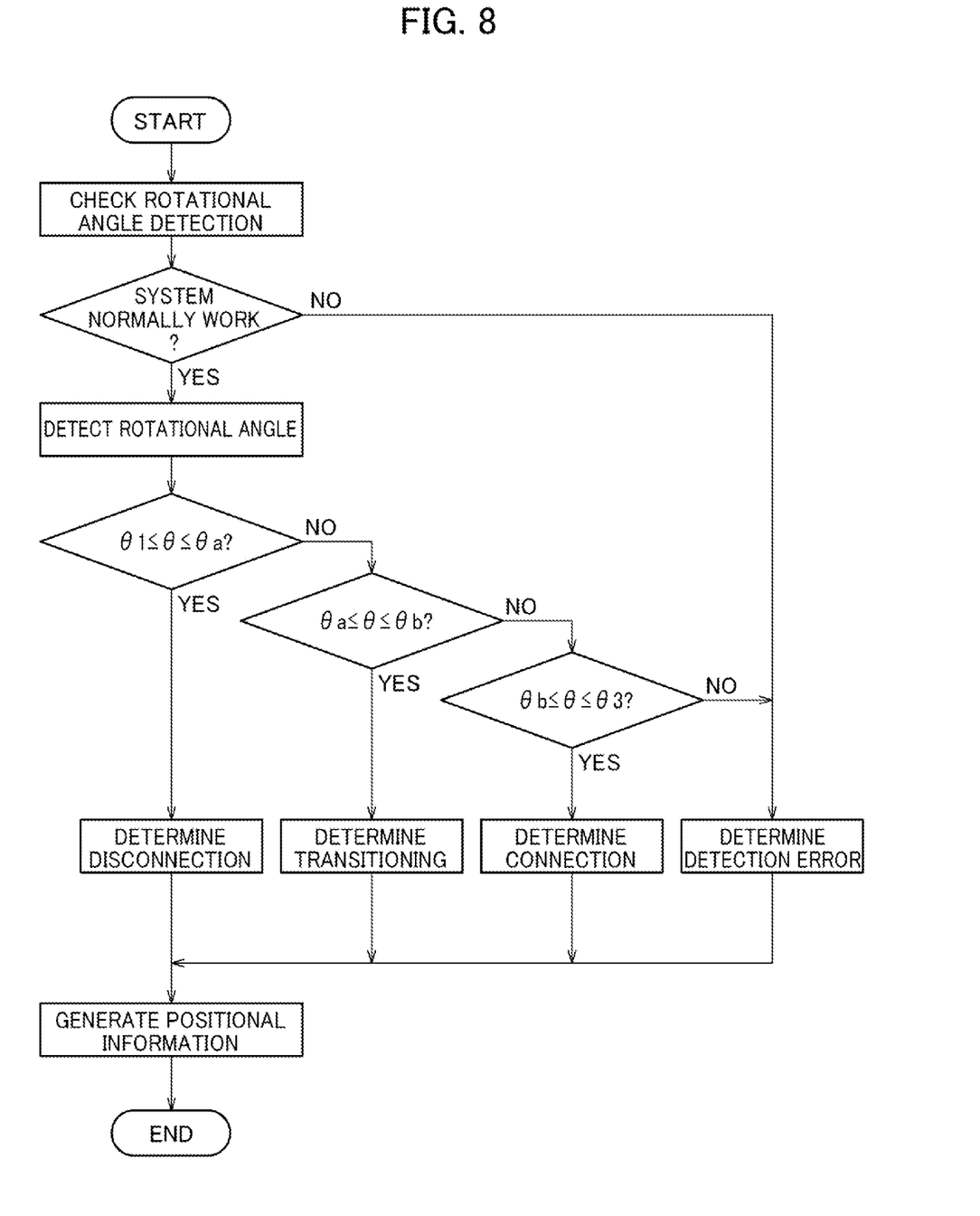
FIG. 8 is a flowchart for determining from the rotational angle where a clutch member is.

The ECU 85, on the basis of the measured rotational angle θ and in accordance with an algorithm such as the flowchart exemplarily shown in FIG. 8, determines whether the clutch 10 is disconnected or connected.

The ECU 85 first checks whether the means for detecting the rotational angle and the system can work normally. The ECU 85 next uses the means for detecting the rotational angle to read out the rotational angle θ, and also read out reference values $θ_a$ and Gb suitable for determination from the storage.

The ECU 85 next compares the measured rotational angle θ with the reference values $θ_a$ and $θ_b$. When the rotational angle θ is in the range from $θ_1$ (initial position) to $θ_a$, it can be determined that the clutch 10 is disconnected. When the rotational angle θ is in the range from $θ_b$ to $θ_3$ (terminal position), it can be determined that the clutch 10 is connected.

The ECU 85 may store the results of determination in the storage to use them for other controls, and transmits the results of determination to other ECUs through the CAN communications.

Figure 9:
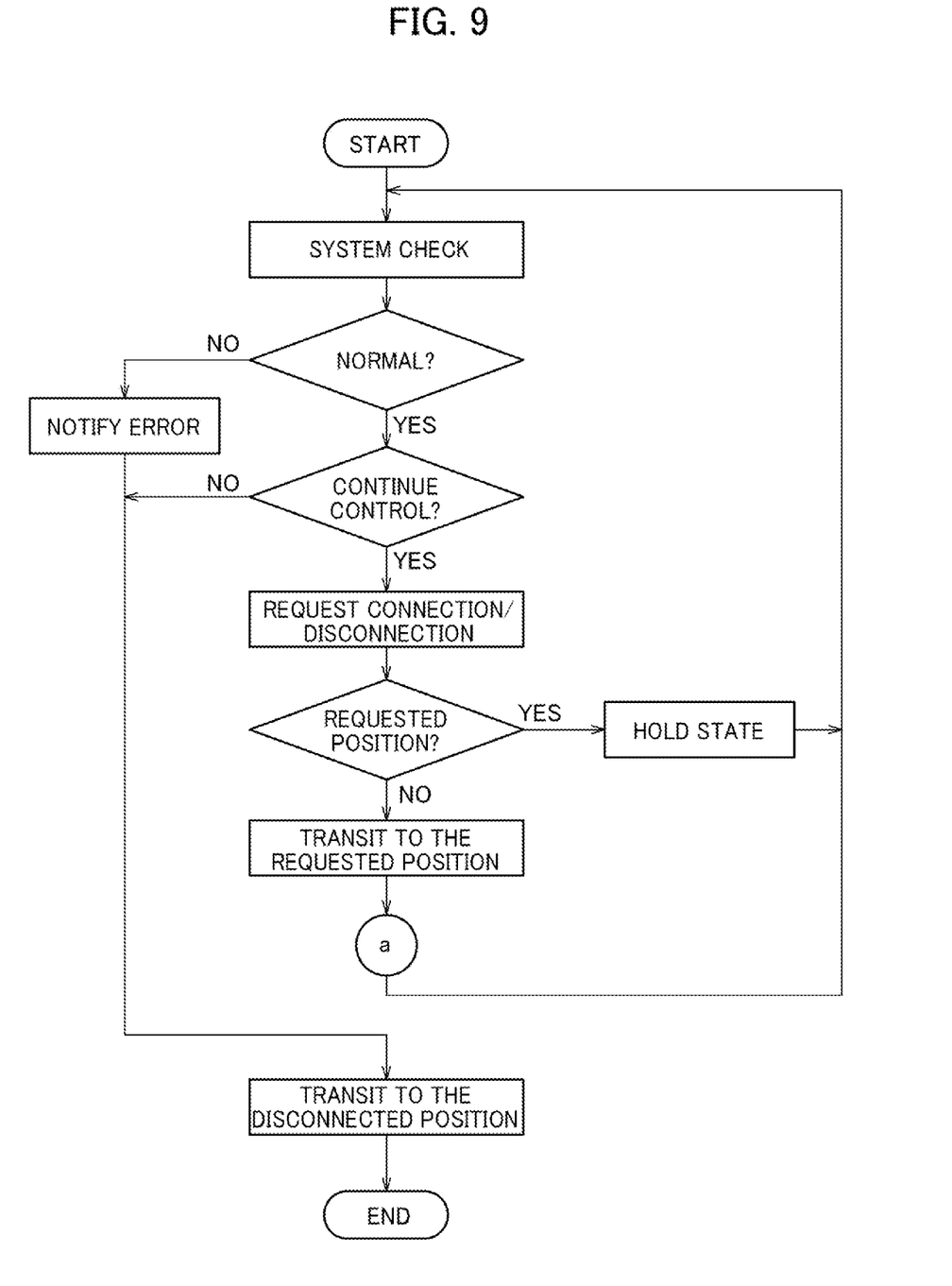
FIG. 9 is a flowchart for controlling a current to be applied to a motor in response to the determined position of the clutch member.

The ECU 85 may as well use the results of determination to execute control of the actuator 1. Referring to FIG. 9, the ECU 85 determines whether conditions for continuing control are met or not, and, in a case where the control should be continued, drives the electric circuit 81 to connect (or disconnect) the clutch 10 and apply required current to the solenoid 31. The ECU 85 next determines whether the clutch member 11 is at a required position (connected position or disconnected position) in accordance with the algorithm as described already. If it determines that the clutch member 11 reaches the required position, the current applied to the solenoid 31 is modified into a level required to keep the state (typically, a power-saving mode). If the position of the clutch member 11 does not meet the required position, the ECU makes the electric circuit 81 output a sufficient current to transit the member to the required position. The ECU 85 further, if conditions for terminating the control are met or any abnormality is detected, makes the electric circuit 81 output a sufficient current to transmit the clutch member 11 to the disconnected position and then terminates the control. Then it may transmit a signal reporting detection of the abnormality, for example, to other ECUs through the CAN communications.

Figure 10:
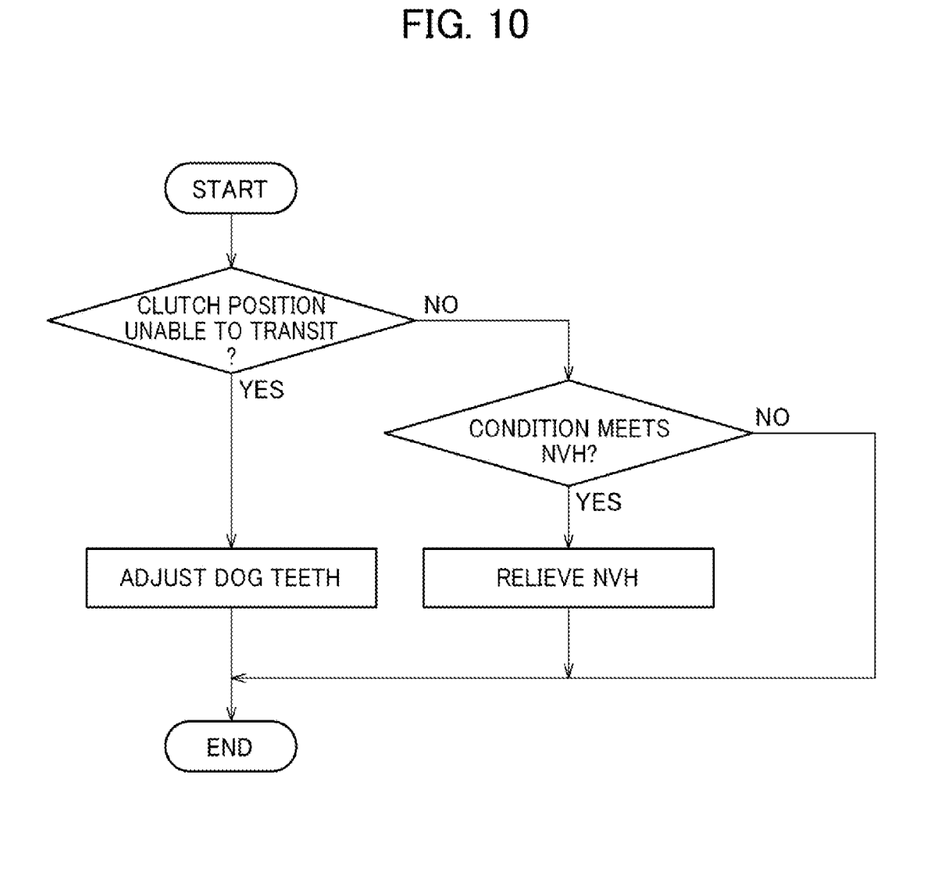
FIG. 10 is a flowchart showing a control flow with additional functions.

The ECU may execute an additional control (sign "a" in FIG. 9) when determining that the clutch member 11 is at the transitional position. As exemplarily shown in FIG. 10 for example, the ECU 85 may determine whether the clutch member 11 is further transiting or not. This determination may be executed by, of course, judging whether the rotational angle θ is changing or not, or by judging whether the change in the rotational angle θ is commensurate with the applied current. The ECU 85 may, if determining that the clutch member 11 is transiting, execute a suitable control for meshing the dog teeth together. Instead of determining that the clutch member 11 is not transiting, the ECU 85 may further determine whether it is in a condition where NVH may occur. If it is determined that NVH would occursuit, the ECU 85 may execute any process for relieving the NVH. This process may, for example, include temporarily halting the clutch member 11 or decelerating its movement. If determining that the NVH would not occur, it may continue the control shown in FIG. 9.

Further, the additional process to be executed by the ECU 85 may be instead executed by any other suitable ECU. The ECU 85 may, for example, transmit a signal representing that the clutch 11 remains at the transitional position through Controller Area Network (CAN) communications that may be received by another ECU. The other ECU receiving the signal may execute a control for suppressing output of the engine or motor 61 down to a certain level for example, thereby relieving the NVH.

Further, the capability of accurately determining the position of the clutch member may enable further suppression of NVH. Referring again to FIG. 6, when the clutch member 11 moves back beyond the initial position $x_1$, and its back face is in contact with the end wall 15E (contact position $x_0$) as shown in FIGS. 3 and 4, then the differential 3 may also generate a noise. Further as being understood with reference to FIG. 5B, when the clutch member 11 moves forward beyond the terminal position $x_3$ and tooth tops of the clutch teeth 17 are in contact with tooth bottoms of the clutch teeth 13 (contact position $x_4$), then the differential 3 may also generate a noise. According to the present embodiment, by determining whether the rotational angle θ of the rotor 35 reaches the angles $θ_0$ and $θ_4$ respectively corresponding to the contact positions $x_0$ and $x_4$, the system can determine whether the noise may be generated or can predict noise generation. Thus by setting any suitable thresholds and controlling the motor 61 thereby, these undesirable situations could be avoided, or the NVH could be suppressed by decelerating the rotation of the motor 61 in advance.

As will be understood from the above description, according to the present embodiment, without adding any particular devices, the clutch system can determine the position of the clutch member and particularly discriminate whether it is at a transitional state or not. Using the determinations, the clutch system can by itself, or in cooperation with the other systems, execute a control for relieving the NVH.

Although certain exemplary embodiments are described above, modifications and variations of the embodiments will occur to those skilled in the art, in light of the above teachings, and are within the scope of the present invention.

What is claimed is:

1. A system for controlling a clutch for regulating transmission of torque about an axis to a vehicle, comprising:
    an action member rotatable about the axis;
    a motor drivingly connected to the action member to impart a rotational motion about the axis to the action member;
    a conversion mechanism drivingly connected to the action member to convert the rotational motion about the axis into an axial motion;

a clutch member constituting the clutch and drivingly connected to the conversion mechanism so as to be driven by the axial motion, the clutch member being movable axially bidirectionally from a first position where the clutch is disconnected, through a second position, to a third position where the clutch is connected; and a controller configured to measure and compare a rotational angle of the motor with a reference value to determine at which of the first position, the second position, and the third position the clutch member is, and wherein the controller is configured to determine whether the determined position of the clutch member agrees with a requested position and, if agreement is not determined, apply to the motor a current to transit the clutch member to the requested position.

2. The system of claim 1, wherein the clutch member comprises dog teeth to mesh with an opposed member so that the clutch comprises a dog clutch and the second position is located where the dog teeth cause collision with the opposed member.

3. The system of claim 1, wherein the conversion mechanism comprises a thrust member in contact with or connected to the clutch member to drive the clutch member, and a cam face, a screw thread, or a spiral track elongated around the axis and tilting relative to a direction of the axis to axially press the thrust member in response to the rotational motion, whereby the conversion mechanism puts the clutch member in a position reflecting the rotational angle.

4. The system of claim 1, wherein one or more of the action member, the motor, and the controller are provided for measuring the rotational angle.

5. The system of claim 1, wherein the controller is configured to determine whether the determined position of the clutch member agrees with a requested position and, if agreement is determined, apply to the motor a current to hold the clutch member at the determined position.

* * * * *